United States Patent
Laberteaux

(10) Patent No.: US 8,896,265 B2
(45) Date of Patent: Nov. 25, 2014

(54) CHARGE TRANSFER DEVICES FOR PLUG-IN ELECTRIC VEHICLES

(75) Inventor: Kenneth P. Laberteaux, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 773 days.

(21) Appl. No.: 13/017,292

(22) Filed: Jan. 31, 2011

(65) Prior Publication Data

US 2012/0194128 A1 Aug. 2, 2012

(51) Int. Cl.
*H02J 7/00* (2006.01)
*B60L 11/18* (2006.01)

(52) U.S. Cl.
CPC .......... *B60L 11/1818* (2013.01); *Y02T 10/7088* (2013.01); *Y02T 90/121* (2013.01); *Y02T 10/7005* (2013.01); *Y04S 30/12* (2013.01); *B60L 11/1838* (2013.01); *Y02T 90/128* (2013.01); *Y02T 90/14* (2013.01); *Y02T 90/168* (2013.01); *Y02T 90/16* (2013.01); *Y02T 90/163* (2013.01)
USPC .......... 320/109; 180/65.1; 180/65.21

(58) Field of Classification Search
USPC .......... 320/109, 110–113; 180/65.1, 65.21
See application file for complete search history.

(56) References Cited

U.S. PATENT DOCUMENTS

| 5,263,565 | A | 11/1993 | Wilkinson |
| 5,563,491 | A | 10/1996 | Tseng |
| 6,081,205 | A | 6/2000 | Williams |
| 6,225,776 | B1 | 5/2001 | Chai |
| 6,614,204 | B2 | 9/2003 | Pellegrino et al. |
| 7,068,991 | B2 | 6/2006 | Parise |
| 8,502,498 | B2 * | 8/2013 | Fecher .......... 320/109 |
| 2004/0065489 | A1 * | 4/2004 | Aberle et al. ......... 180/65.1 |
| 2008/0136371 | A1 * | 6/2008 | Sutardja .......... 320/109 |
| 2009/0174365 | A1 | 7/2009 | Lowenthal et al. |
| 2009/0261779 | A1 * | 10/2009 | Zyren .......... 320/109 |
| 2009/0287578 | A1 | 11/2009 | Paluszek et al. |
| 2009/0313098 | A1 * | 12/2009 | Hafner et al. ......... 705/14.1 |
| 2010/0049639 | A1 | 2/2010 | Ferro et al. |
| 2010/0134067 | A1 | 6/2010 | Baxter et al. |
| 2010/0156349 | A1 | 6/2010 | Littrell |
| 2010/0161393 | A1 | 6/2010 | Littrell |
| 2010/0161479 | A1 | 6/2010 | Littrell et al. |
| 2010/0161480 | A1 | 6/2010 | Littrell |
| 2010/0161481 | A1 * | 6/2010 | Littrell .......... 705/40 |
| 2010/0161482 | A1 | 6/2010 | Littrell et al. |
| 2010/0161483 | A1 | 6/2010 | Littrell |
| 2010/0174629 | A1 | 7/2010 | Taylor et al. |
| 2010/0188042 | A1 | 7/2010 | Yeh |
| 2010/0191585 | A1 * | 7/2010 | Smith .......... 705/13 |
| 2010/0198751 | A1 | 8/2010 | Jacobus |

(Continued)

*Primary Examiner* — Yalkew Fantu
(74) *Attorney, Agent, or Firm* — Dinsmore & Shohl LLP

(57) ABSTRACT

A charge transfer device for a plug-in electric vehicle (PEV) includes a charging cable system that supplies electric power to the PEV. The charging cable system having a first end connected to a first electrical connector that connects to the PEV for a charging operation and a second, opposite end connected to a second electrical connector for connecting to a power outlet. A meter unit is located between the first and second ends of the charging cable system. The meter unit determines electrical power information for use during the charging operation. A communications unit is located between the first and second ends of the charging cable system. The communications unit communicates the electrical power information to a remote server.

19 Claims, 5 Drawing Sheets

(56) References Cited

U.S. PATENT DOCUMENTS

| | | |
|---|---|---|
| 2010/0207588 A1* | 8/2010 | Lowenthal et al. .......... 320/165 |
| 2010/0211643 A1 | 8/2010 | Lowenthal et al. |
| 2010/0225475 A1 | 9/2010 | Karch et al. |
| 2010/0237985 A1* | 9/2010 | Landau-Holdsworth et al. ............................ 340/5.8 |
| 2010/0241542 A1 | 9/2010 | Pinkusevich et al. |
| 2010/0274690 A1 | 10/2010 | Tate, Jr. |

* cited by examiner

CHARGE TRANSFER DEVICES FOR PLUG-IN ELECTRIC VEHICLES

TECHNICAL FIELD

The present specification generally relates to charging plug-in electric vehicles, and more particularly to charge transfer devices for plug-in electric vehicles and methods of charging using the charge transfer devices.

BACKGROUND

An electric-powered vehicle is mounted with a power storage device (such as secondary battery or capacitor for example) and travels by using driving force generated from electric power stored in the power storage device. The electric-powered vehicle includes, for example, electric vehicles, hybrid vehicles and fuel-cell vehicles.

In recent years, techniques have been proposed for charging a power storage device mounted on such electric-powered vehicles by a commercial power supply having a high power generation efficiency. As one example, a technique has been proposed for charging a power storage device mounted on plug-in electric-powered vehicles (PEVs) by a commercial power supply providing electric power to charging stations (e.g., a power source of a relatively low voltage such as 100 V or 200 V). When a power storage device mounted on a PEV is charged, a plug of a charge cable may be connected to a connector provided to the vehicle. This charge cable may be used to transfer power from the commercial power supply to the power storage device of the PEV. However, these charging operations often require complicated inter-operating systems between the PEV and the charging stations for payment.

SUMMARY

In one embodiment, a charge transfer device for a plug-in electric vehicle (PEV) includes a charging cable system that supplies electric power to the PEV. The charging cable system having a first end connected to a first electrical connector that connects to the PEV for a charging operation and a second, opposite end connected to a second electrical connector for connecting to a power outlet. A meter unit is located between the first and second ends of the charging cable system. The meter unit determines electrical power information for use during the charging operation. A communications unit is located between the first and second ends of the charging cable system. The communications unit communicates the electrical power information to a remote server.

In another embodiment, a system for charging a plug-in electric vehicle (PEV) includes a server. A charge transfer device includes a charging cable system that supplies electric power to the PEV. The charging cable system has a first end connected to a first electrical connector that connects to the PEV for a charging operation and a second, opposite end connected to a second electrical connector for connecting to a power outlet. A meter unit is located between the first and second ends of the charging cable system. The meter unit determines electrical power information for use during the charging operation. A communications unit is located between the first and second ends of the charging cable system. The communications unit communicates the electrical power information to the server. A mobile communications device is provided that accesses a web-based charge payment application for authorizing a payment based on the electrical power information.

In another embodiment, a method of charging a plug-in electric vehicle (PEV) comprises: providing at least one of billing information, personal information and vehicle information to a charge transfer device comprising a charging cable system that supplies electric power to the PEV; connecting a first end of the charging cable to the PEV using a first electrical connector; connecting a second, opposite end of the charging cable to a power outlet; generating electrical power information using an amount of power flow transferred to the PEV using a meter unit located between the first and second ends of the charging cable; and communicating the electrical power information to a remote server for a billing operation using the electrical power information and the at least one of the billing information, personal information and vehicle information.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to charge transfer devices for plug-in electric vehicles (PEVs). The charge transfer devices may generally include a first end with an electrical connector connected thereto for connecting to a power source, such as a commercial power source, and a second, opposite end including another electrical connector connected thereto that connects to the PEV for a charging operation. As will be described in greater detail below, the charge transfer device may include "smart" features such a meter unit that can generate electrical power information for use during the charging operation and a communications unit for communicating the electrical power information, for example, to a remote server, e.g., for billing purposes. One or more of these smart features may be located in-line within a charging cable system of the charge transfer device, between the first and second ends. The charge transfer device can be used when the vehicle operator charges the PEV while away from home for charging the vehicle operator or reimbursing the power outlet owner for the charging operation.

Figure 1:
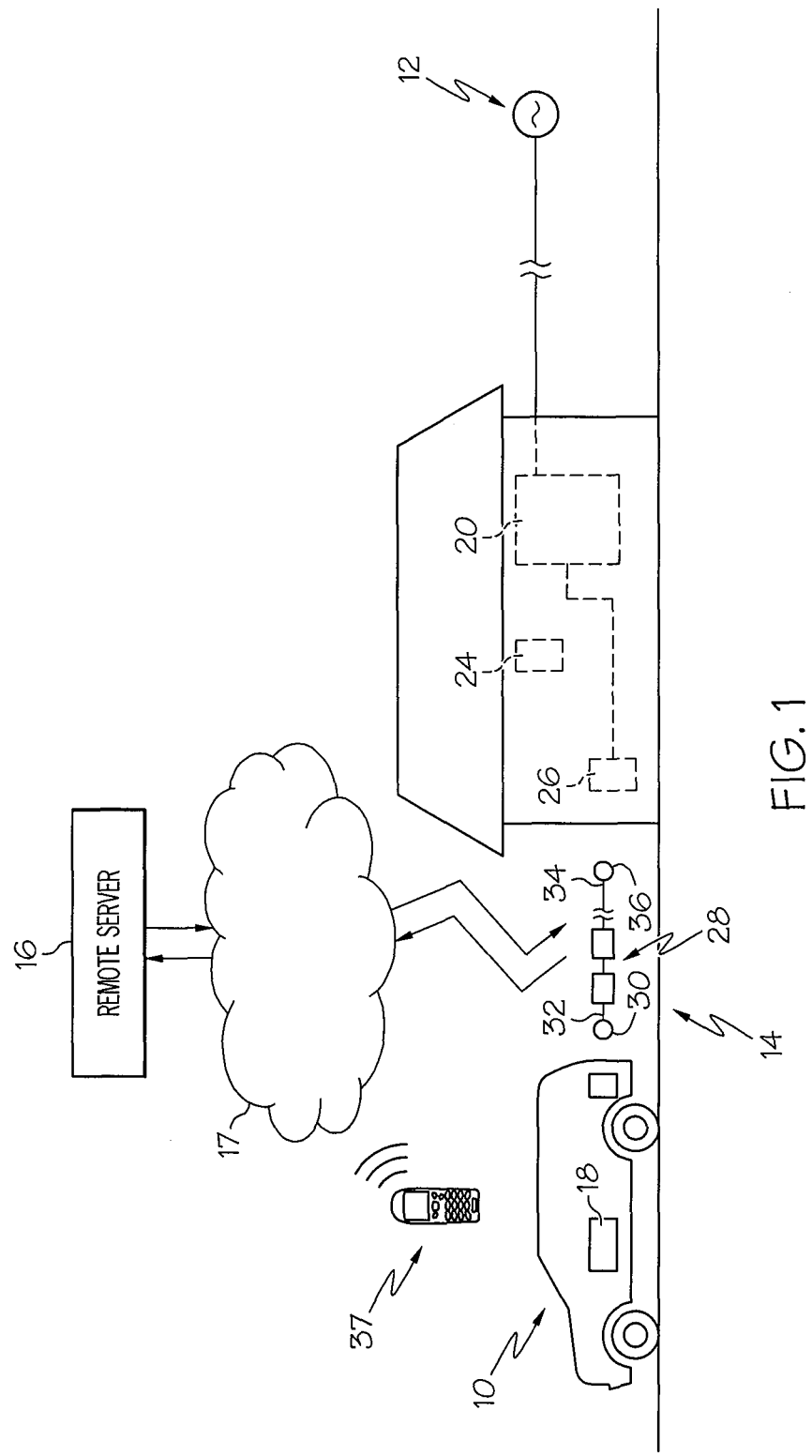
FIG. 1 illustrates a system for charging a plug-in electric vehicle using a charge transfer device according to one or more embodiments shown and described herein.

Referring to FIG. 1, a PEV 10 is illustrated in proximity to an electric power supply 12 that can be used to provide electric power to the PEV 10 during a charging operation using a charge transfer device 14. A remote server 16 may be provided for communication with the charge transfer device 14 (e.g., via the Internet 17 or other suitable network) to receive information from the charge transfer device 14. The PEV 10 is provided with a power storage device 18 (e.g., a rechargeable battery) and travels using the electric power supplied by the power storage device 18. The power storage device 18 of the PEV 10 is externally rechargeable, for example, using the electric power supply 12 or other suitable power supply.

In the illustrated embodiment, the electric power supply 12 may be connected to an electric power supply device 20 that is provided in a residential house 22 for household use. The household owner may be different from the vehicle operator. In other embodiments, structures other than a residential house may be available, such as a hotel, school, parking garage, hospital or other business connected to an electric power supply 12. The electric power supply device 20 may supply electric power fed from the system power supply 12 of an electric power company, to various home electrical appliances 24 and power outlets 26 in the house 22. The charge transfer device 14 may generally include a power cable system 28 that includes an electrical connector 30 connected at one end 32 of the power cable system 28 for connecting to the PEV 10 and an opposite end 34 including another electrical connector 36 for connecting to the power outlet 26. In some embodiments, the charge transfer device 14 may be releasably connected to one or both of the PEV 10 and the power outlet 26 via the electrical connectors 30 and 36. In other embodiments, the charge transfer device 14 may be permanently connected to the PEV 10 or power supply device 20. By "permanently connected", it is meant that the charge transfer device 14 cannot be removed without damaging one or more components of the charge transfer device 14.

A mobile communication device 37 may be used by the vehicle operator, which may be any type of WLAN or WPAN compatible device. In some embodiments, the mobile communication device 37 may communicate with the charge transfer device 14, for example, to monitor charging. The mobile communications device 37 may also be used to communicate with the server 16, for example, over the Internet 17. Various exemplary mobile communication devices include Wi-Fi devices, such as a personal, hand-held and laptop computers; and BlueTooth devices, such as a mobile phone.

Figure 2:
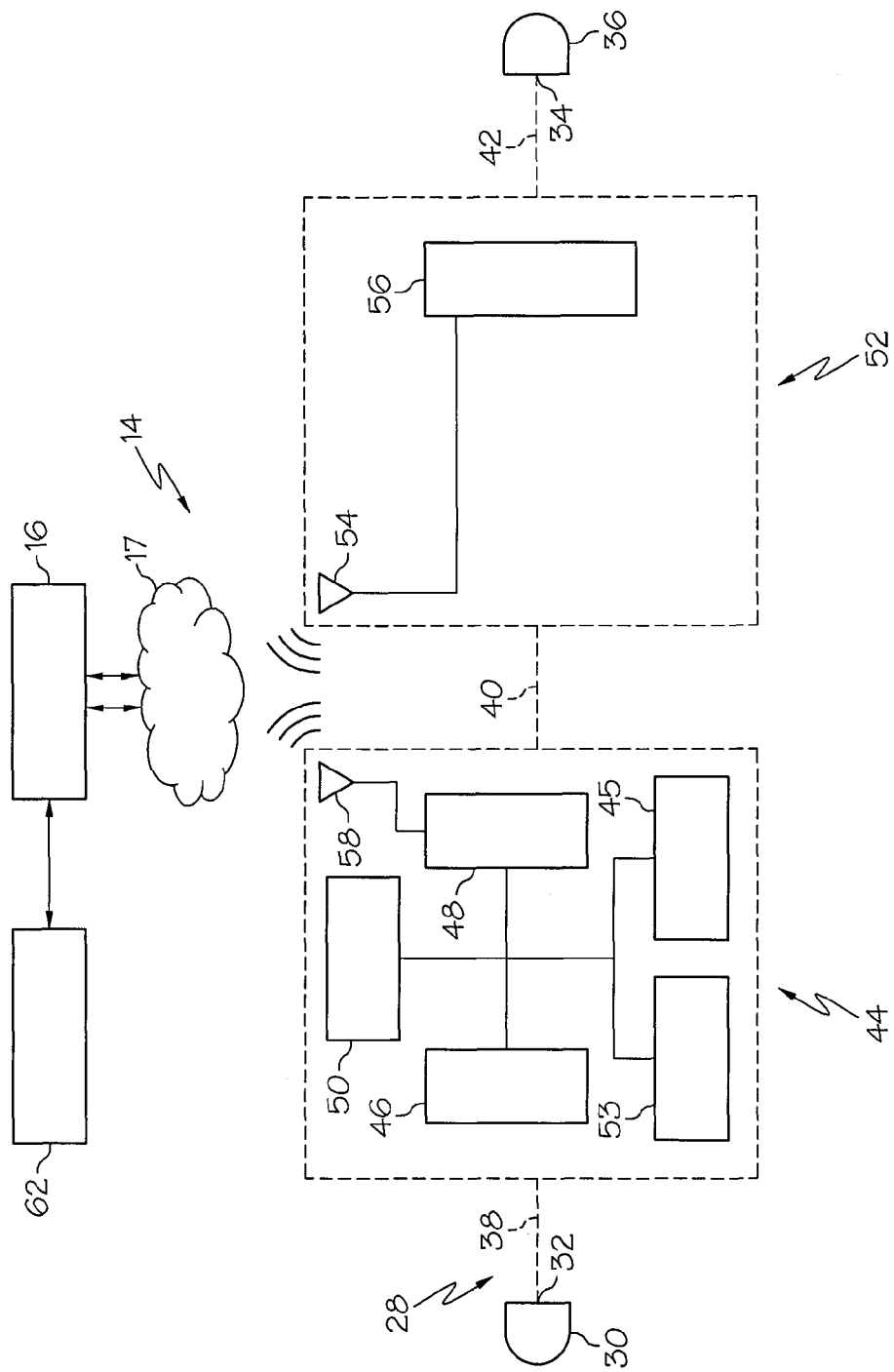
FIG. 2 illustrates the charge transfer device of FIG. 1 according to one or more embodiments shown and described herein.

Referring to FIG. 2, the charge transfer device 14 is illustrated in isolation. The charge transfer device 14 includes the cable system 28 including the electrical connector 30 located at the end 32 and the electrical connector 36 located at the opposite end 34. In some embodiments, the cable system 28 may include multiple cable segments 38, 40 and 42 that extend between the electrical connectors 30 and 36. The electrical connectors 30 and 36 may be different in that electrical connector 30 may only be connectable to the PEV 10 and not the power outlet 26 and electrical connector 36 may only be connectable to the power outlet 26 and not the PEV 10. In other embodiments, the electrical connectors 30 and 36 may be connectable to both the power outlet 26 and the PEV 10 interchangeably.

The charge transfer device 14 further includes a meter unit 44 connected to the charging cable system 28 at a location between the first and second ends 32 and 34 of the charging cable system 28. The meter unit 44 may include a power measuring device 46 such as one capable of measuring current (e.g., using an induction coil) and a controller 48 that monitors signals from the power measuring device 46 to generate electrical power information. In some embodiments, the power measuring device 46 and controller 48 can calculate power provided to the PEV 10 using the charge transfer device 14 and/or power consumed by the PEV 10 (e.g., based on a power level of the power storage device 18 saved in a memory 50 from a previous charging operation). The meter unit 44 may include a user interface 45, which may include a touch screen and/or display, a touch pad or keyboard, which may provide a QWERTY layout in one embodiment, a AZERTY or QWERTZ layout in other embodiments, and navigational buttons for selecting between various options and/or functions. In some embodiments, the meter unit 44 may include a location device 53, such as a GPS device for providing location information, for example, to the controller 48.

The charge transfer device 14 further includes a communications unit 52 connected to the charging cable system 28 at a location between the first and second ends 32 and 34 of the charging cable system 28. It should be noted that while the communications unit 52 is illustrated as a separate module from the meter unit 44, the communications unit 52 and the meter unit 44 may be part of the same module, e.g., within the same housing. It should also be noted that the term "meter unit" broadly refers to any device providing metering functions as described herein and "communications unit" broadly refers to any device providing communication functions as described herein. As one example, the communications unit may be part of the metering unit. In some embodiments, the communications unit 52 may include an antenna 54 and a controller 56 that receives signals from the antenna 54. The antenna 54 may receive electrical power information from the power measuring device 46 via an antenna 58 and the controller 48 of the meter unit 44. In some embodiments, the electrical power information may be provided to the controller 56 via the charging cable system 28. Communication between the various components may be achieved by any suitable connection, such as using Bluetooth, infrared, wired connections (e.g., USB), etc.

The communications unit 52 may communicate with the remote server 16 via a network 17. The remote server 16 may be associated with one or more of a consumer or consumer's vehicle (e.g., a portable communications device, personal computer, laptop computer, vehicle ECU, etc.), the household owner (sometimes referred to as the power outlet owner), the power owner regarding the electrical power information for charging the PEV 10 and/or some other payment facilitating service for billing purposes. As one example, the communications unit 52 and remote server 16 may be connected with a billing processor 62 through the network 17. The network 17 may connect any of the components to enable communication of data and may include wired networks, wireless networks, or combinations thereof. The wireless network 17 may be a cellular telephone network, a network operating according to a standardized protocol such as IEEE 802.11, 802.16, 802.20, or WiMax network. The network 17 may be a public network, such as the Internet, a private network, such as an intranet, or combinations thereof, and may utilize a variety of networking protocols now available or later developed including, but not limited to TCP/IP based networking protocols. The network(s) 17 may include one or more of a local area network (LAN), a wide area network (WAN), a direct connection such as through a Universal Serial Bus (USB) port, and the like, and may include the set of interconnected networks that make up the Internet. The network 17 may include any communication method or employ any form of machine-readable media for communicating information from one device or entity to another. For example, the vehicle operator may submit a payment over the network 17 to the billing processor 62. The billing processor 62 may be coupled with additional networks for submitting the payment, such as a credit/debit/ATM card authorization network. Various payment and billing procedures will be discussed in greater detail below.

Figure 3:
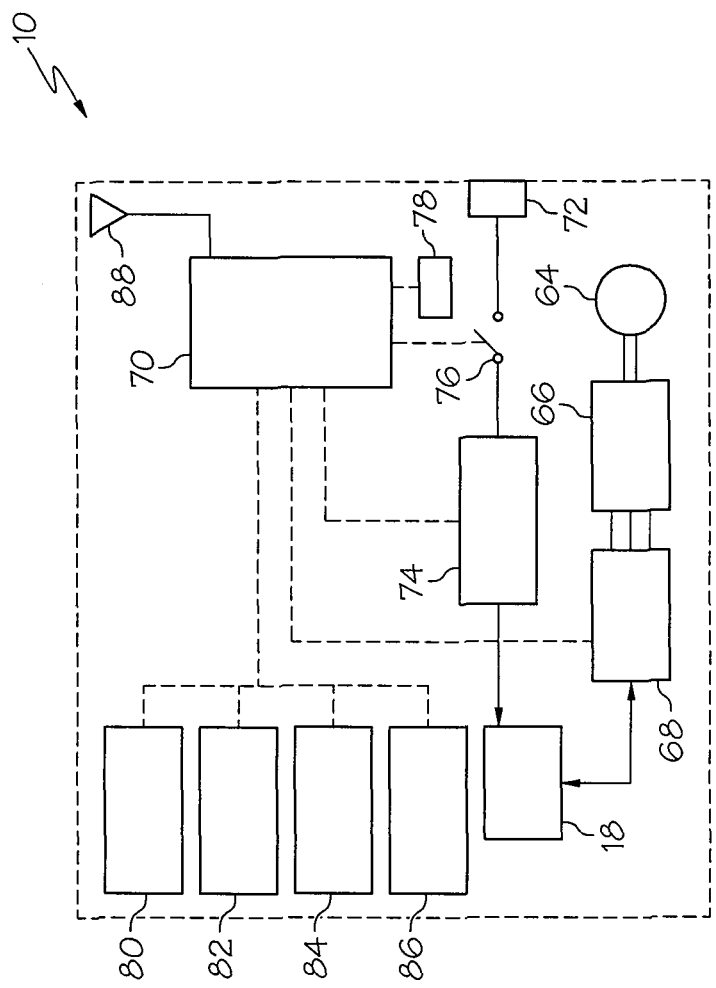
FIG. 3 illustrates the plug-in electric vehicle of FIG. 1 according to one or more embodiments shown and described herein.

Referring to FIG. 3, an exemplary embodiment of the PEV 10 may include a wheel 64, a motor 66 for driving wheel 64, an inverter 68 for supplying three-phase AC power to motor 66, the power storage device 18 for storing electric power to be supplied to motor 66, and an ECU 70 for performing general control of PEV 10. While a PEV may refer to a vehicle using only electric power as energy for traveling, the term PEV is not meant to exclude other plug-in type vehicles using electric power as energy such as hybrid vehicles.

The PEV 10 may further include a connector 72 to which charge transfer device 14 is connected, an AC/DC conversion unit 74 for charging provided for converting AC power fed to the connector 72 into DC power and providing the DC power to the power storage device 18, a switch 76 for connecting connector 72 and AC/DC conversion unit 74 for charging, and a connection detection unit 78 for detecting connection of the charge transfer device 14 to the connector 72.

The PEV 10 may also include a vehicle information storage unit 80, a travel information detection unit 82, an input unit 84, a display unit 86 and a communication antenna 88. The vehicle information storage unit 80 may store information such as a vehicle ID, vehicle type, vehicle size and vehicle weight, (collectively referred to as vehicle information), as examples, and may also store travel information detected by travel information detection unit 82. The vehicle information and travel information may be accessible by the ECU 70 and transmitted to the charge transfer device 14 via communication antenna 88.

Figure 4:
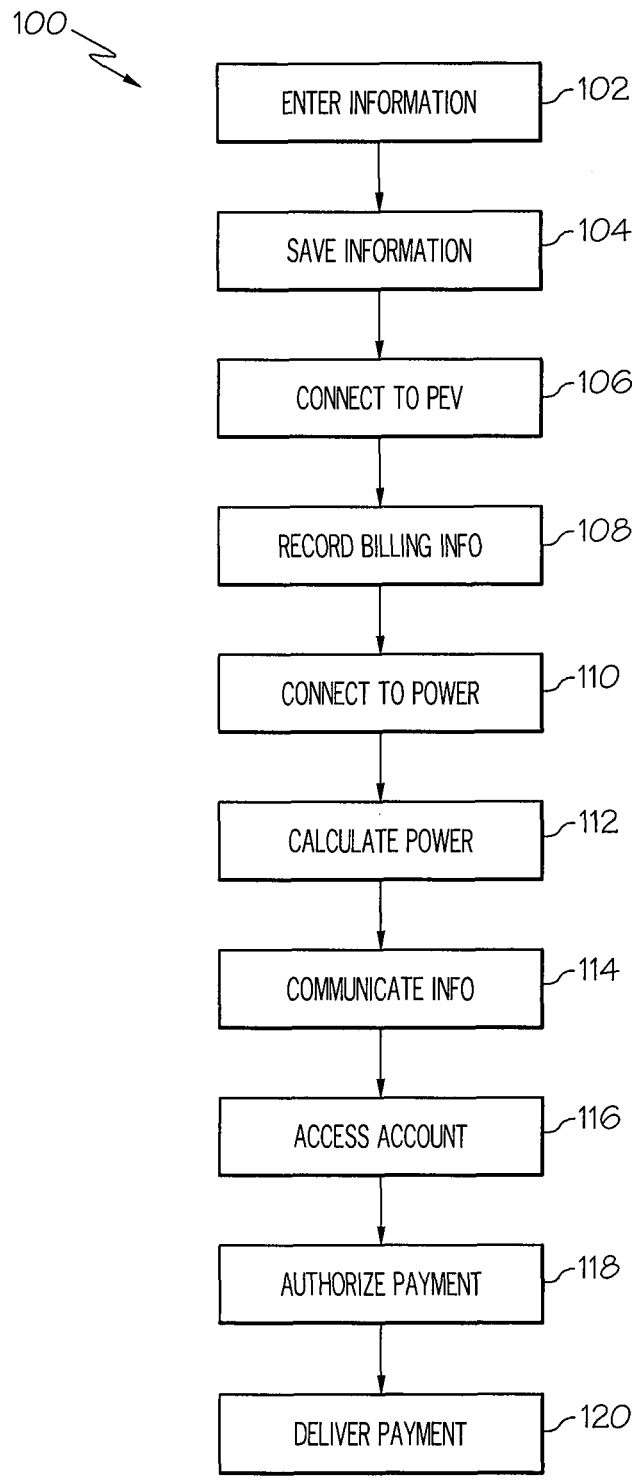
FIG. 4 illustrates a method of charging a plug-in electric vehicle using a charge transfer device according to one or more embodiments shown and described herein.

Referring to FIG. 4, an exemplary method 100 for charging the PEV 10 using the charge transfer device 14 is illustrated. At step 102, such as during an initial use, the consumer may be prompted by the meter unit 44 (e.g., using the controller 48 and user interface 45) to enter personal (e.g., name, billing address, etc.), vehicle (e.g., vehicle type, current mileage, etc.) and billing information (e.g., credit card number and security code, credit card expiration date, PayPal account information, bank routing and account information, e-cash account information, etc.) which may be saved in memory 50 at step 104. In some embodiments, at least some of the personal, vehicle and/or billing information may be obtained by the meter unit 44 from the PEV 10 automatically, for example, from the vehicle information storage unit 80.

Because the charge transfer device 14 may obtain personal, vehicle and/or billing information for a particular vehicle operator, the charge transfer device 14 may be personal to that vehicle operator (i.e., intended for use by a particular consumer). In other embodiments, however, multiple profiles (e.g., for multiple vehicle operators) may be created for different consumers where personal and billing information is entered and used for charging and billing purposes. In these embodiments, a particular profile may be selected from amongst a list of profiles for a charging operation. Visual and/or audio indicators may be employed to aid in selection of the correct profile, such as names, avatars, sounds, etc. Unique passwords or other security mechanisms may be used to prevent unauthorized access to the charge transfer device 14 and the personal, vehicle and/or billing information for one or more of the profiles. Alternatively, personal, vehicle and/or billing information may be requested each time prior, during or after a particular charging operation and the information may not be saved in memory (i.e., the charge transfer device 14 may not be personal to a limited number or only one vehicle operator).

At step 106, the charge transfer device 14 may be connected to the PEV 10 using the electrical connector 30 before connecting to the power outlet 26. At step 108, the meter unit 44 may record time of day, date, location, current power source charge and other factors accessible by the meter unit 44 for billing purposes. At step 110, the charge transfer device 14 may be connected to the power outlet 26 using the electrical connector 36 and charging of the power storage device 18 may begin. The amount of power flow to the power storage device 18 through the charge transfer device 14 may be calculated by the meter unit 44 at step 112.

At step 114, during and/or after the charging operation is completed, the personal, vehicle and/or billing information may be communicated to the remote server 16 using the communications unit 52. In one exemplary embodiment, the remote server 16 may host a web service using software that receives the various information from the charge transfer device 14 to facilitate the processing of a payment by the vehicle operator (e.g., vehicle driver). At step 116, the vehicle operator may log into an account through the web service, for example, using a personal electronics device, computer, smart phone, etc. The web service may have or obtain price information from, for example, the home owner's power company and use that information to generate a price based on the billing and/or vehicle information. In some embodiments, the web service may be provided by the local power company. At step 118, the vehicle operator may authorize a payment to the power outlet owner, which may be similar to or the same as an e-check system, credit card or debit card payment, PayPal payment, etc. The payment may then be delivered to the power outlet owner or to an account of the power outlet owner at step 120 to reconcile the amount owed to the power outlet owner.

Figure 5:
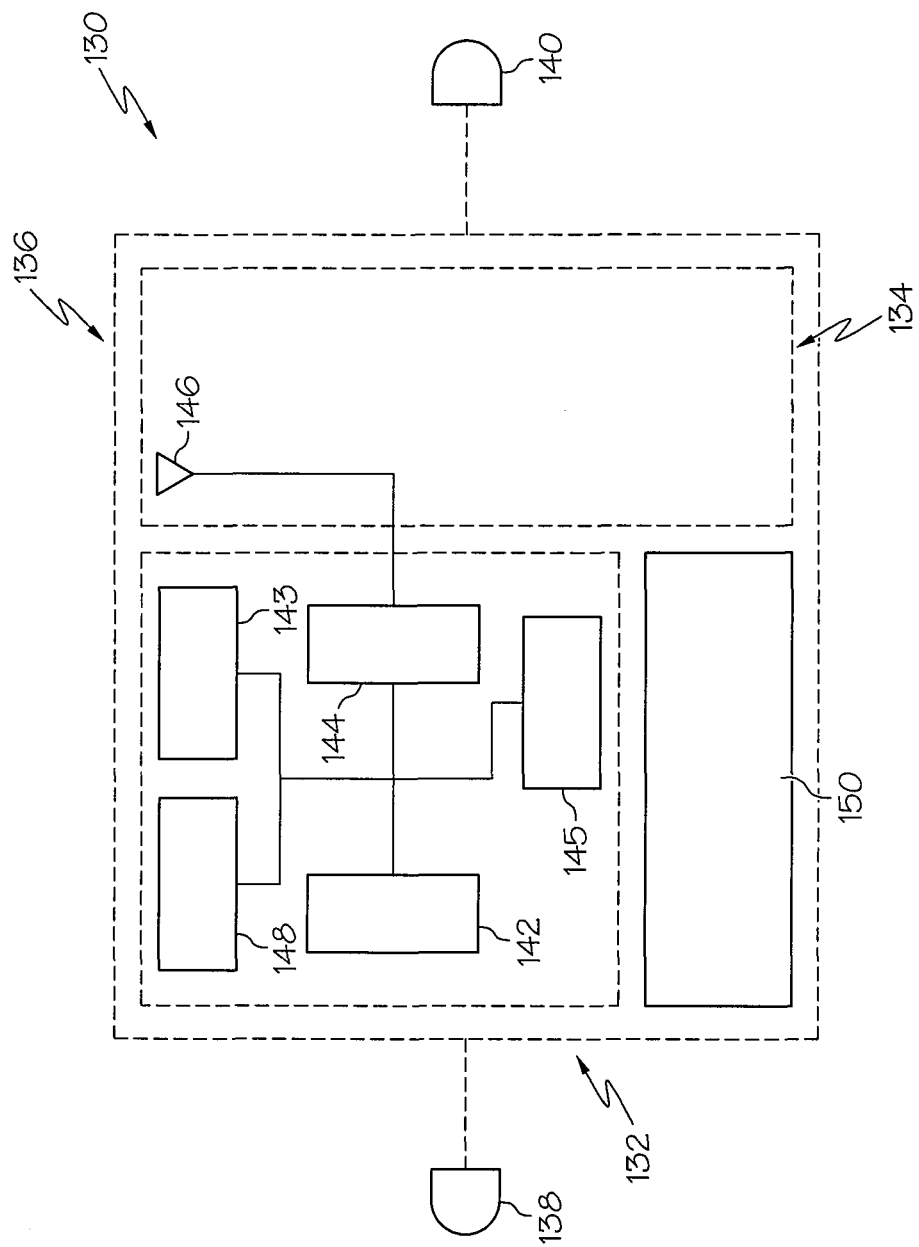
FIG. 5 illustrates another embodiment of a charge transfer device according to one or more embodiments shown and described herein.

Referring to FIG. 5, another embodiment of a charge transfer device 130 is illustrated where a meter unit 132 and communications unit 134 are part of a same module 136 that is located in-line, between electrical connector 138 that connects to the PEV 10 and electrical connector 140 that connects to the power source 26. Similar to the charge device 14 described above, the meter unit 132 may include a power measuring device 142, a memory 143, a user interface 145 and a controller 144 that monitors signals from the power measuring device 142 to generate electrical power information. The communications unit 134 may include an antenna 146 that receives electrical power information from the controller 144. The communications unit 134 may communicate with the remote server 16 via the network 17.

In the illustrated embodiment, the charge transfer device 130 may include a location device 148, such as a GPS device for providing location information, for example, to the controller 144. The charge transfer device 130 may also include a payment acceptance device 150 that receives at least one payment from the vehicle operator. As one example, the payment acceptance device 150 may include a card reader, e.g., capable of reading a magnetic strip and/or an RFID signal. In some embodiments, the charge transfer devices 14 and 130 may allow or deny access to electrical charging power depending receipt of a payment or authorization of a payment transaction. These embodiments may be useful where the charge transfer devices are provided to numerous vehicle operators, such as by a parking garage, school or other business location. In some embodiments, the charge transfer device 130 or the web service may allow the owner of the charge transfer device some control over the price calculation. For example, a business may add a fee in addition to the cost of the power used to charge the PEV 10.

As used herein, the term "electric vehicle" includes any vehicle that includes one or more electric motors that are used for propulsion, such as an all-electric vehicle that uses only electricity, and/or a plug-in hybrid-electric vehicle that uses a gas powered engine in combination with batteries charged by an external power source or an engine and generator, to propel the vehicle. Moreover, as used herein, the term "controller" and "processor" are interchangeable, and refer to a central processing unit, a microprocessor, a microcontroller, a microcomputer, a reduced instruction set circuit (RISC), an application specific integrated circuit (ASIC), a programmable logic controller, and any other circuit that is capable of being used as described herein. Furthermore, as used herein, the terms "software" and "firmware" are interchangeable, and include any computer program stored in memory for execution by a controller, including random access memory (RAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

The above-described charge transfer devices can allow a vehicle operator the ability to charge a PEV while away from home using a portable, in-line charge transfer device capable of automatically performing appropriate billing (e.g., requesting the payment from the driver and/or subtracting the charge from the power plug owner). The charge transfer devices can be carried by the PEVs, for example, within the trunk or other storage location and connected to the PEV and the power outlet for charging. The charge transfer devices may then communicate to a remote server for billing purposes using the meter unit and communications unit. The vehicle operator may then initiate one or more payments, for example, to the power plug owner or to the local power company, itself depending on the type of web service provided.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A charge transfer device for a plug-in electric vehicle (PEV), the charge transfer device comprising:
   a charging cable system that supplies electric power to the PEV, the charging cable system having a first end connected to a first electrical connector that connects to the PEV for a charging operation and a second, opposite end connected to a second electrical connector for connecting to a supply outlet;
   a meter unit located between and in-line with the first and second ends of the charging cable system, the meter unit determines electrical power information for use during the charging operation; and
   a communications unit located in-line with the meter unit and between and in-line with the first and second ends of the charging cable system, the communications unit communicates the electrical power information to a remote server, wherein the charging cable system, the meter unit, and the communications unit are portable and sized to travel with the PEV.

2. The charge transfer device of claim 1 wherein the first electrical connector and the second electrical connector are different such that the first electrical connector and the second electrical connector are not interchangeable.

3. The charge transfer device of claim 1, wherein the meter unit comprises a power measuring device and a controller that monitors signals from the power measuring device to generate the electrical power information.

4. The charge transfer device of claim 1, wherein the communications unit communicates the electrical power information wirelessly to the remote server.

5. The charge transfer device of claim 1 further comprising a payment acceptance device.

6. The charge transfer device of claim 5, wherein the payment acceptance device is a card reader.

7. A system for charging a plug-in electric vehicle (PEV), comprising:
   a server;
   a charge transfer device comprising:
      a charging cable system that supplies electric power to the PEV, the charging cable system having a first end connected to a first electrical connector that connects to the PEV for a charging operation and a second, opposite end connected to a second electrical connector for connecting to a supply outlet;
      a meter unit located between and in-line with the first and second ends of the charging cable system, the meter unit determines electrical power information for use during the charging operation; and
      a communications unit located in-line with the meter unit and between and in-line with the first and second ends of the charging cable system, the communications unit communicates the electrical power information to the server; and
   a mobile communications device that accesses a web-based charge payment application for authorizing a payment based on the electrical power information.

8. The system of claim 7, wherein the server hosts the web-based charge payment application.

9. The system of claim 7, wherein the mobile communications device is one of a cellular phone, a laptop computer and a hand-held computing device.

10. The system of claim 7, wherein the first electrical connector and the second electrical connector are different such that the first electrical connector and the second electrical connector are not interchangeable.

11. The system of claim 7, wherein the meter unit comprises a power measuring device and a controller that monitors signals from the power measuring device to generate the electrical power information.

12. The system of claim 7, wherein the communications unit communicates the electrical power information wirelessly to the server.

13. A method of charging a plug-in electric vehicle (PEV), comprising:
   providing at least one of billing information, personal information and vehicle information to a charge transfer device comprising a charging cable system that supplies electric power to the PEV;
   connecting a first end of the charging cable system to the PEV using a first electrical connector;
   connecting a second, opposite end of the charging cable system to a supply outlet;
   generating electrical power information using an amount of power flow transferred to the PEV using a meter unit located between and in-line with the first and second ends of the charging cable system; and communicating the electrical power information to a remote server using a communications unit located in-line with the meter unit and between and in-line with the first and second ends of the charging cable system, wherein the electrical power information is used for a billing operation using the electrical power information and the at least one of the billing information, personal information and vehicle information.

14. The method of claim 13 further comprising saving the at least one of the billing information, personal information and vehicle information in memory of the charge transfer device.

15. The method of claim 13, wherein the power outlet is owned by an entity other than an operator of the PEV.

16. The method of claim 13 further comprising authorizing the billing operation using a mobile communications device.

17. The method of claim 16, wherein the mobile communications device is one of a cellular phone, a laptop computer and a hand-held computing device.

18. The method of claim 13, wherein the meter unit comprises a power measuring device and a controller that monitors signals from the power measuring device to generate the electrical power information.

19. The method of claim 13, wherein the electrical power information is communicated wirelessly by the charge transfer device to the remote server.

* * * * *